US009660488B2

(12) United States Patent
Breedvelt-Schouten et al.

(10) Patent No.: US 9,660,488 B2
(45) Date of Patent: May 23, 2017

(54) ELECTRIC RING WITH EXTERNAL POWER SOURCE

(71) Applicant: International Business Machines Corporation, Armonk, NY (US)

(72) Inventors: Ilse M. Breedvelt-Schouten, Ontario (CA); Jana H. Jenkins, Raleigh, NC (US); Jeffrey A. Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/044,229

(22) Filed: Feb. 16, 2016

(65) Prior Publication Data

US 2016/0336758 A1 Nov. 17, 2016

Related U.S. Application Data

(63) Continuation of application No. 14/710,736, filed on May 13, 2015.

(51) Int. Cl.
*H02J 17/00* (2006.01)
*H02J 50/12* (2016.01)
(Continued)

(52) U.S. Cl.
CPC ............ *H02J 50/12* (2016.02); *H02J 7/0044* (2013.01); *H02J 7/025* (2013.01)

(58) Field of Classification Search
CPC ........... H02J 17/00; H02J 50/00–50/90; G06F 1/163; A44C 9/00; A44C 9/007;
(Continued)

(56) References Cited

U.S. PATENT DOCUMENTS 3,790,775 A * 2/1974 Rosenblatt ............... A44C 5/00
362/104
D262,527 S * 1/1982 Goldberg ....................... D10/31
(Continued)

FOREIGN PATENT DOCUMENTS

IT WO 2015067289 A1 * 5/2015 ............. H04B 1/385
JP 08138403 A * 5/1996
(Continued)

OTHER PUBLICATIONS

Machine translation for JP08-138403A.*
(Continued)

*Primary Examiner* — Fritz M Fleming
(74) *Attorney, Agent, or Firm* — Reza Sarbakhsh

(57) ABSTRACT

Embodiments of the present invention may relate generally to electrical systems, and more particularly, to a structure, system, and method of powering an electric ring with an external power source. An energy storage ring may be used to store energy and transmit energy to the electric ring. The energy storage ring may include an energy storage device and an energy transmission device. The electric ring may include an energy receiver device and one or more energy consuming devices. The energy transmission device of the energy storage ring may be configured to transmit energy to energy receiver device of the electric ring. Utilizing the energy storage ring to store energy may increase energy available for use by the electric ring, thus substantially increasing types and number of devices that may be included in the electric ring.

1 Claim, 5 Drawing Sheets

(51) Int. Cl.
*H02J 7/00* (2006.01)
*H02J 7/02* (2016.01)

(58) Field of Classification Search
CPC ....... A44C 9/0015; A44C 9/0023; A44C 9/03; A44C 9/053; A44C 5/0015; A44C 15/0015; Y10T 307/305
USPC .... 63/15, 15.1, 15.2, 15.3, 15.4; 307/18, 43, 307/42, 150, 154, 155, 156
See application file for complete search history.

(56) References Cited

U.S. PATENT DOCUMENTS

| | | | |
|---|---|---|---|
| 5,653,524 A * | 8/1997 | Gray | A44C 15/0015 362/104 |
| 6,050,695 A * | 4/2000 | Fromm | A44C 15/0015 362/104 |
| 6,452,362 B1 | 9/2002 | Choo | |
| 7,578,070 B1 | 8/2009 | Lynch | |
| 7,937,965 B2 | 5/2011 | Hering | |
| 8,090,418 B2 * | 1/2012 | Thiel | H04B 1/385 455/575.2 |
| 8,395,282 B2 | 3/2013 | Joannopoulos et al. | |
| 8,419,204 B2 | 4/2013 | Hermann, II | |
| 8,624,554 B2 * | 1/2014 | Ajagbe | H04M 19/08 320/114 |
| 8,875,542 B2 | 11/2014 | Severs | |
| 2002/0109596 A1 | 8/2002 | Phillips et al. | |
| 2005/0193769 A1* | 9/2005 | Ebara | A44C 17/0241 63/15.1 |
| 2010/0298677 A1 | 11/2010 | Lu et al. | |
| 2012/0212938 A1 | 8/2012 | Nguyen et al. | |
| 2014/0143785 A1 | 5/2014 | Mistry et al. | |
| 2014/0274395 A1* | 9/2014 | Ellsworth | A63F 13/00 463/37 |
| 2014/0276244 A1 | 9/2014 | Kamyar | |
| 2014/0285416 A1 | 9/2014 | Priyantha et al. | |
| 2014/0350696 A1 | 11/2014 | Haas | |
| 2015/0338916 A1 | 11/2015 | Priyantha et al. | |

FOREIGN PATENT DOCUMENTS

| | | | | |
|---|---|---|---|---|
| WO | WO 2010077656 A1 * | 7/2010 | ......... | A44C 15/0015 |
| WO | 2015077418 A1 | 5/2015 | | |
| WO | WO2015077418 A1 | 5/2015 | | |

OTHER PUBLICATIONS

De Miranda et al.; "Adjustable Interactive Rings for iDTV", IEEE Transactions on Consumer Electronics, vol. 56 No. 3, Aug. 2010, pp. 1988-1996.

Gummeson et al.; "An Energy Harvesting Wearable Ring Platform for Gesture Input on Surfaces", MobiSys'14, ACM Proceedings of the 12 th Annual International Conference on Mobile Systems, Appliances, and Services, Jun. 16-19, 2014, pp. 162-175.

Goto et al.; "A Finger-Ring UWB Monopole Antenna for BAN and PAN", Antennas and Propagation Society International Symposium (APSURSI), 2010 IEEE, Jul. 11-17, 2010, pp. 1-4.

Chatterjee et al.; "Design of a Touch Sensor Based Single Finger Operated Wearable User-Interface Terminal", SICE-ICASE/IEEE International Joint Conference, Oct. 18-21, 2006, pp. 4142-4147.

Benchoff, "Adding LEDS to an Engagement Ring", http://hackaday.com/2013/05/20/adding-leds-to-an-engagement-ring/, Feb. 10, 2015, pp. 1-14.

Bonsor et al, "How Digital Jewelry Will Work",http://electronics.howstuffworks.com/gadgets/home/digital-jewelry1.htm, accessed Feb. 10, 2015, pp. 1-2.

Wikipedia, "Inductive Charging", http://en.wikipedia.org/wiki/Inductive_charging, Feb. 14, 2014, pp. 1-6.

"iRing-iPod Ring Concept", http:www.tuvie.com/iring-ipod-ring-concept/, accessed Feb. 10, 2015 pp. 1-18.

"Designboom", http//www.designboom.com/project/ring-phone/, accessed Feb. 10, 2015, pp. 1-10.

Parrack, "The Ring Clock: A Wristwatch for Your Finger", http//www.gizmag.com/ring-clock-wristwatch/28918, accessed Feb. 10, 2015, pp. 1-8.

http://techcrunch.com/2014/02/03/apple-said-to-be-exploring-inductive-, "Apple Said to be Exploring Inductive Charging and Solar Power in iWatch Testing", accessed May 13, 2015, pp. 1-9.

Pending U.S. Appl. No. 14/710,736, filed May 13, 2015, titled "Electric Ring with External Power Source," , pp. 1-26.

IBM: List of IBM Patents or Patent Applications Treated As Related (Appendix P), Apr. 27, 2016, pp. 1-2.

* cited by examiner

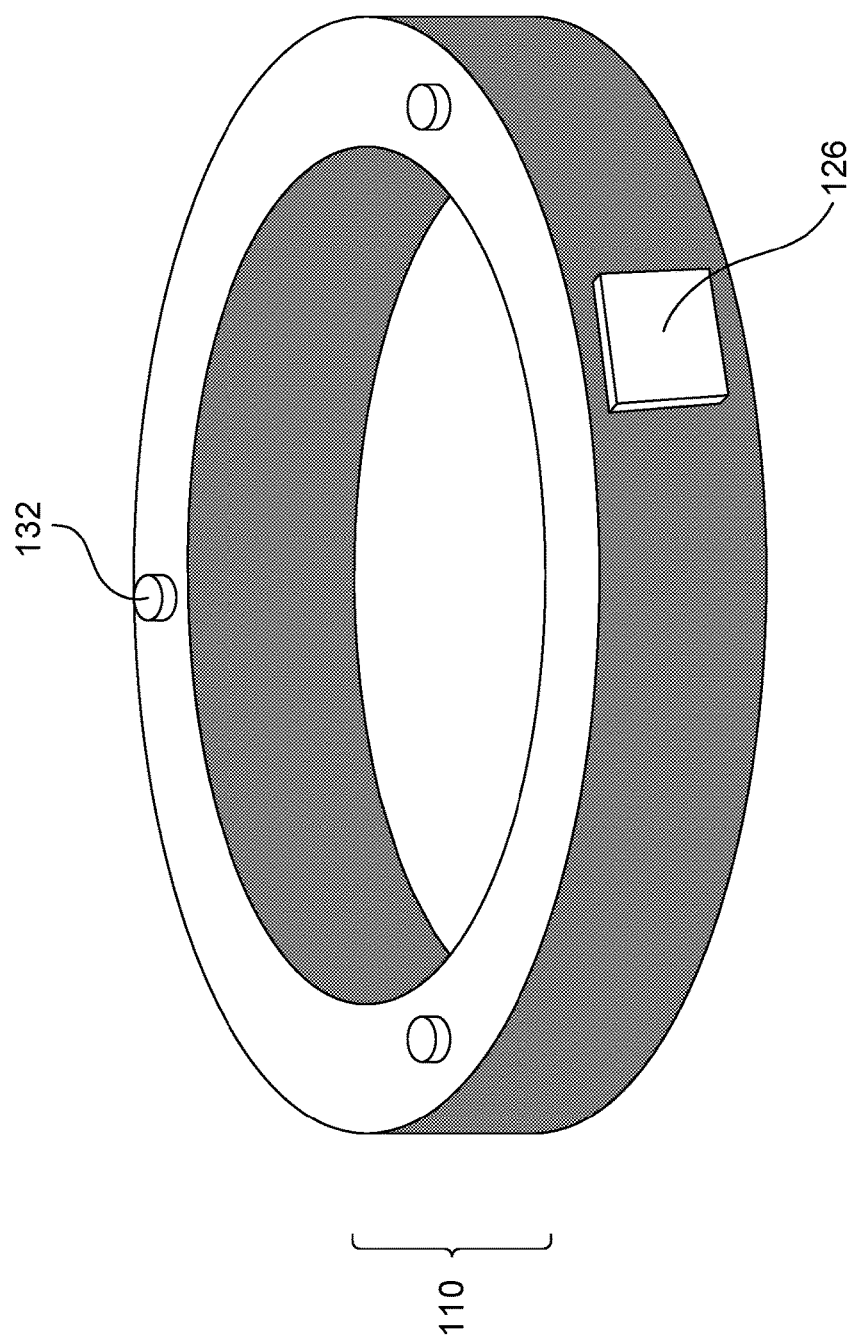

ELECTRIC RING WITH EXTERNAL POWER SOURCE

BACKGROUND

The present invention relates generally to electrical systems, and more particularly to an electric ring with an external power source.

Conventional electric rings may contain limited functionality due to the difficulty of including a sufficient battery and computer processing system into a single ring. For instance, a conventional electric ring may merely offer light-emitting diodes (LED) to keep energy consumption low. Additional functionality in a ring may increase electrical power consumption, thus increasing a ring's energy storage needs. However, including features, such as, for example, a small display to show text and/or images, may require more energy storage than may be realistically stored within a ring. Thus, an innovative energy storage system may be needed to enable an electric ring with increased functionality.

SUMMARY

According to an embodiment, a method is disclosed. The method may include: forming a first energy storage ring having a cylindrical shape with a hollow inner region. The first energy storage ring includes an energy storage device and an energy transmission device. The energy storage device is electrically connected to the energy transmission device. An electric ring having a cylindrical shape with a hollow inner region is formed. The electric ring includes an energy receiver device and one or more energy consuming devices. The energy receiver device is electrically connected to one or more energy consuming devices. The energy receiver device of the electric ring is configured to receive energy generated by the energy transmission device of the energy storage ring. A coupling mechanism connects the first energy storage ring and the electric ring when the first energy storage ring and the electric ring are within proximity of one another.

According to an embodiment, a system is disclosed. The system may include: a first energy storage ring having a cylindrical shape with a hollow inner region and an electric ring having a cylindrical shape with a hollow inner region. The first energy storage ring includes an energy storage device and an energy transmission device. The energy storage device is electrically connected to the energy transmission device. The electric ring includes an energy receiver device and one or more energy consuming devices. The energy receiver device is electrically connected to the one or more energy consuming devices. The energy receiver device of the electric ring is configured to receive energy generated by the energy transmission device of the energy storage ring. A coupling mechanism connects the first energy storage ring and the electric ring when the first energy storage ring and the electric ring are within a proximity of one another.

According to an embodiment, a structure is disclosed. The structure may include: a first energy storage ring having a cylindrical shape with a hollow inner region and an electric ring having a cylindrical shape with a hollow inner region. The first energy storage ring includes an energy storage device and an energy transmission device. The energy storage device is electrically connected to the energy transmission device. The electric ring includes an energy receiver device and one or more energy consuming devices. The energy receiver device is electrically connected to one or more energy consuming devices. The energy receiver device of the electric ring is configured to receive energy generated by the energy transmission device of the energy storage ring. A coupling mechanism connects the first energy storage ring and the electric ring when the first energy storage ring and the electric ring are within proximity of one another.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which not all structures may be shown.

FIGS. 1A-1B are an isometric view and a cross-section view, respectively, of an energy storage ring, according to an embodiment of the present invention.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1B:
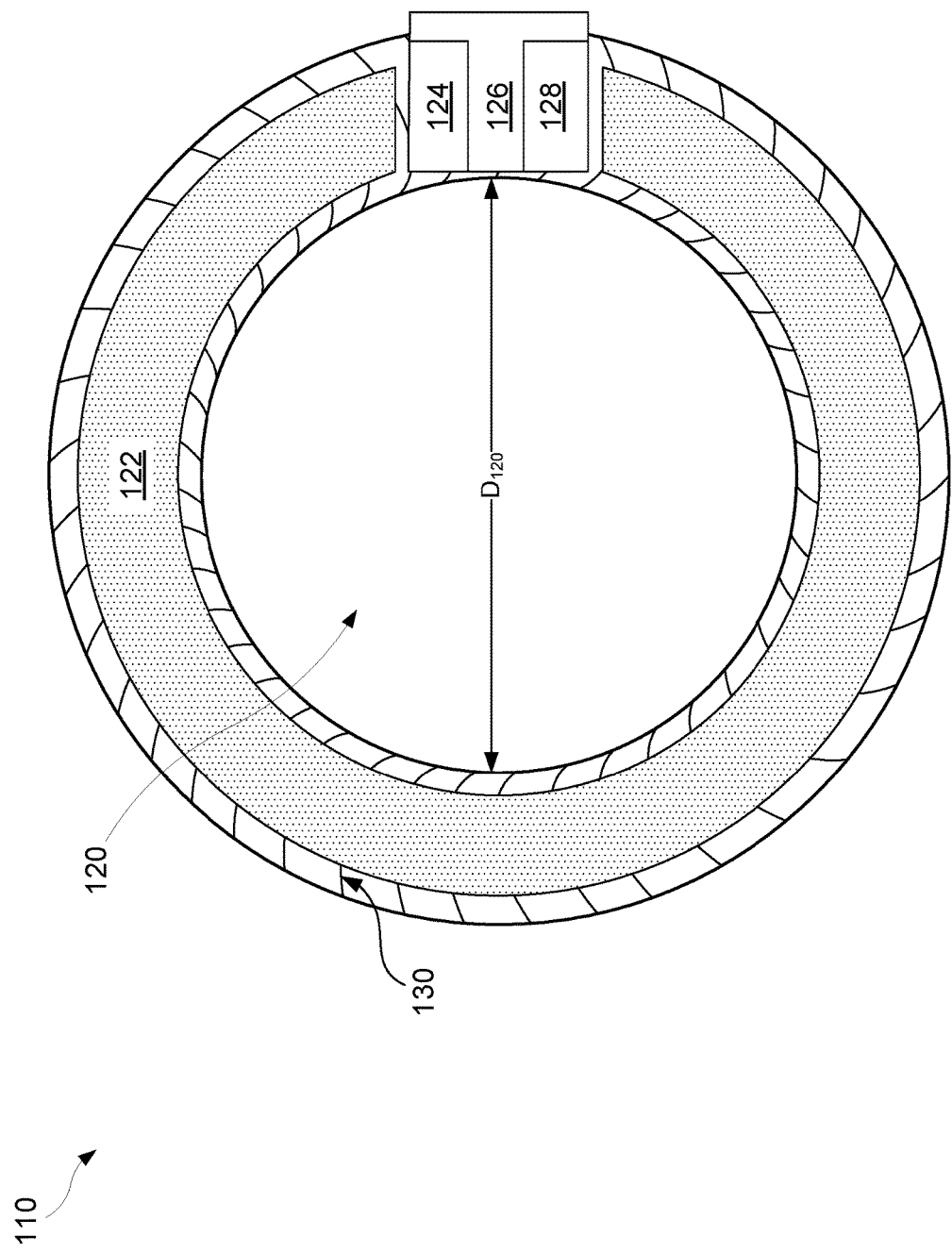

Detailed embodiments of the claimed structures and methods are disclosed herein. Embodiments of the structure and/or method may include a computer readable storage medium (or media) having computer readable program instructions thereon for causing a processor to carry out aspects of the present invention. However, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

For purposes of the description hereinafter, the terms "upper", "lower", "right", "left", "vertical", "horizontal", "top", "bottom", and derivatives thereof shall relate to the disclosed structures and methods, as oriented in the drawing figures. It will be understood that when an element such as a layer or region is referred to as being "on", "over", "beneath", "below", or "under" another element, it may be present on or below the other element or intervening elements may also be present. In contrast, when an element is referred to as being "directly on", "directly over", "directly beneath", "directly below", or "directly contacting" another element, there may be no intervening elements present. Furthermore, the terminology used herein is for the purpose of describing particular embodiments only and is not intended to be limiting of the invention. As used herein, the singular forms "a," "an," and "the" are intended to include the plural forms as well, unless the context clearly indicates otherwise.

For purposes of the description hereinafter, the terms "outer," "outermost," and derivatives thereof shall relate to the side, portion, or region of an element such as a layer closest to an outer edge of a device. The terms "inner," "innermost," and derivatives thereof shall relate to the side, portion, or region of an element such as a layer closest to a center of a device. In other word, the terms "inner," "innermost," and derivatives thereof shall relate to a side, portion, or region of an element that is further from the edge of a device than a side, portion, or region of an element that is described as "outer," "outermost," and derivatives thereof.

Embodiments of the present invention may relate generally to electrical systems, and more particularly, to a method, system, and structure of an electric ring with an external power source. A conventional electric ring may have a battery and energy consuming devices within a single ring. Including a battery and energy consuming devices within a single ring may limit the space available for a battery, and thus, limit a quantity of energy which may be stored within a battery. An electric ring with limited energy storage may also have limited functionality to reduce a frequency with which charging is required. For example, a conventional electrified ring may include an LED light or other simple low-energy consuming devices. Some conventional electrified rings may include higher energy consuming devices but, due to small energy storage capacity, may also require frequent charging resulting in substantial interruptions in use.

Embodiments of the present invention may provide power to an electric ring with energy consuming devices by providing an external energy source so that substantially more energy may be utilized by the electric ring. An energy storage ring may be placed in proximity to an electric ring. The energy storage ring may be used to store energy and transmit energy to the electric ring to enable energy consuming devices on the electric ring to use substantially more energy than may be stored within the electric ring. The electric ring may operate over a longer period of time before consuming locally available energy by having energy provided by the energy storage ring compared to a duration of time the electric ring could operate with internally stored energy alone. The energy storage ring may permit the electric ring to operate for a longer period of time because a substantially larger volume is available for an energy storage device within the energy storage ring than may be available within the electric ring, because a substantial portion of the electric ring's volume may be occupied by one or more energy consuming devices. In addition, since the energy storage ring may be interchangeable with another energy storage ring, it may be quickly replaced to have uninterrupted use of the electric ring. By utilizing a separate ring to store energy, substantially more energy may be available for use by the electric ring, thus substantially increasing types and number of devices that may reasonably be included within the electric ring. For example, and further described in the figures below, the electric ring may include a display, a camera, a projector, wireless transmission devices, and other energy consuming devices. Embodiments of the present invention will now be described with reference to FIGS. 1-3.

Referring now to FIGS. 1A-1B, an isometric view and a cross section view, respectively, illustrating an energy storage ring 110 are shown. In an embodiment, the energy storage ring 110 may have a cylindrical shape with a hollow inner region 120. In another embodiment, the energy storage ring 110 may have a torus shape. In an embodiment, the energy storage ring 110 may be substantially circular when viewed from the top or bottom. In another embodiment, the energy storage ring 110 may be oval or oblong when viewed from the top or bottom. An outer shell of the energy storage ring 110 may be composed of any material known in the art, such as, for example, metal, plastic, or a combination thereof. In an embodiment, the energy storage ring 110 may be worn on a user's body, such as, for example, a finger, wrist, ankle, arm, leg, neck, waist, etc. In a preferred embodiment, a user may wear the energy storage ring on a finger. The hollow inner region 120 may have a diameter $D_{120}$ ranging from approximately 1 cm to approximately 50 cm, and ranges therebetween. In a preferred embodiment, the diameter $D_{120}$ may range from approximately 1 cm to approximately 3 cm, and ranges therebetween.

The energy storage ring 110 may include any energy storage device 122. The energy storage device 122 may be situated within the energy storage ring 110. In an embodiment, the energy storage device may occupy a substantial portion of a volume of the energy storage ring 110. In an embodiment, the energy storage device 122 may be inside the energy storage ring 110 and wrap around the hollow inner region 120. In an embodiment, the energy storage device 122 may occupy a majority of a volume within the energy storage ring 110. The energy storage device 122 may include any energy storage technology known in the art, such as, for example, a battery, capacitor, fuel cell, flywheel, superconducting magnetic energy storage (SMES), or any combination thereof. For example, the energy storage device 122 may include a rechargeable battery, such as, for example, a flow battery, lead-acid battery, lithium air battery, lithium-ion battery, lithium-iron battery, molten salt battery, nickel-cadmium battery, nickel-hydrogen battery, nickel-iron battery, nickel metal hydroxide battery, nickel-zinc battery, organic radical battery, polymer-based battery, polysulfide bromide battery, potassium-ion battery, rechargeable alkaline battery, silicon air battery, silver-zinc battery, silver calcium battery, sodium-ion battery, sodium-sulfur battery, sugar battery, super iron battery, ultrabattery, or any combination thereof. In a preferred embodiment, the energy storage ring 110 may include a rechargeable lithium-iron battery. The energy storage ring 110 may be charged using any charging device known in the art, such as, for example, a motion-powered charging device, a photovoltaic charging device, an induction based charging device, a plug-in charging device, or any combination thereof.

The energy storage ring 110 may contain one or more wireless energy transmission devices 130 (hereinafter "energy transmission devices"). The energy transmission devices 130 may include any energy transmission technology known in the art, such as, for example, a near-field transmission device, a far-field transmission device, or any combination thereof. Near-field transmission devices may include, for example, an inductive coupling device, a capacitive coupling device, and a magnetodynamic coupling device. In a preferred embodiment, the energy transmission devices 130 may include an inductive coupling device. For example, the energy transmission devices 130 may include a resonant inductive coupling device. A resonant inductive coupling device may be used to transfer energy from the energy storage ring 110 to another device with similarly installed technology. In an embodiment where the energy transmission devices 130 includes an inductive coupling device, the energy transmission devices 130 may comprise a number of conductive coils. The conductive coils may border an outermost surface of the energy storage ring 110 to minimize transmission losses. In an embodiment, the conductive coils may wrap around an entire circumference of the energy storage ring 110. In another embodiment, the conductive coils may wrap partially around a circumference of the energy storage ring 110. An alternating current may run through the conductive coils to generate an alternating magnetic field. The alternating magnetic field may induce a current in another device placed within proximity of the energy storage ring 110.

The energy storage ring 110 may contain one or more power converter devices 124 (hereinafter "power converter"). The power converter 124 may include any power conversion technology known in the art, such as, for example, a direct current (DC) to alternating current (AC) converter (e.g. an inverter), AC to DC converter (e.g. a rectifier), a DC to DC converter (e.g. a voltage regulator), an AC to AC converter (e.g. a transformer), or any combination thereof. In an embodiment, the energy storage device 122 may provide DC to the power converter 124 and the power converter 124 may change to AC. In an embodiment, AC may be delivered from the power converter 124 to the energy transmission devices 130.

The energy storage ring 110 may contain a coupling mechanism 132 to attach the energy storage ring to another device. The coupling mechanism 132 may include one or more coupling devices known in the art, such as, for example, a male or female connector, male or female fastener, curved surface, magnet, or any combination thereof. A curved surface may include an indented or protruding surface which may correspond to another device to allow the devices to fit together. In an embodiment involving a combination of coupling devices, the coupling mechanism 132 may comprise a male connector and a magnet to anchor itself to another device. In another embodiment involving a combination of coupling devices, the coupling mechanism 132 may comprise a protruding curved surface and a magnet which may correspond with an indented curved surface and an opposite magnet in a corresponding device.

The energy storage ring 110 may contain a switch 126 so the device may turn on and off. In an embodiment, the switch 126 may be controlled by a user. For example, the switch 126 may include a button on the outside of the energy storage ring 110 which a user may press to turn the device on or off. In another embodiment, the switch 126 may include a sensor which detects another device to turn the device on or off. For example, the switch 126 may detect another device within proximity in need of energy and turn on the energy storage ring 110.

The energy storage ring 110 may contain a computing device 128. The computing device 128 may include a computer readable storage medium. The computer readable storage medium can be a tangible device that can retain and store data, including instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), and any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The computing device 128 may include a processor.

The processor may include any data processing device known in the art, such as, for example, a central processing unit (CPU) or any other device or combination of devices that carry out computer program instructions. Computer readable program instructions may be provided to the processor of a general purpose computer, special purpose computer, or other programmable data processing apparatus, such that the instructions, which execute via the processor of the computer or other programmable data processing apparatus, create means for implementing programmed functions. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the programmed function. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the programmed functions. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. In an embodiment, one or more sensors may provide the computing device 128 with various data inputs, such as, for example, a quantity of energy remaining in the energy storage device 122, whether or not the energy storage ring 110 is within proximity to another device, whether the energy transmission devices 130 have been switched on or off, or any combination thereof. In an embodiment, the computing device 128 may analyze this data and/or transmit this data to another device.

Figure 2A:
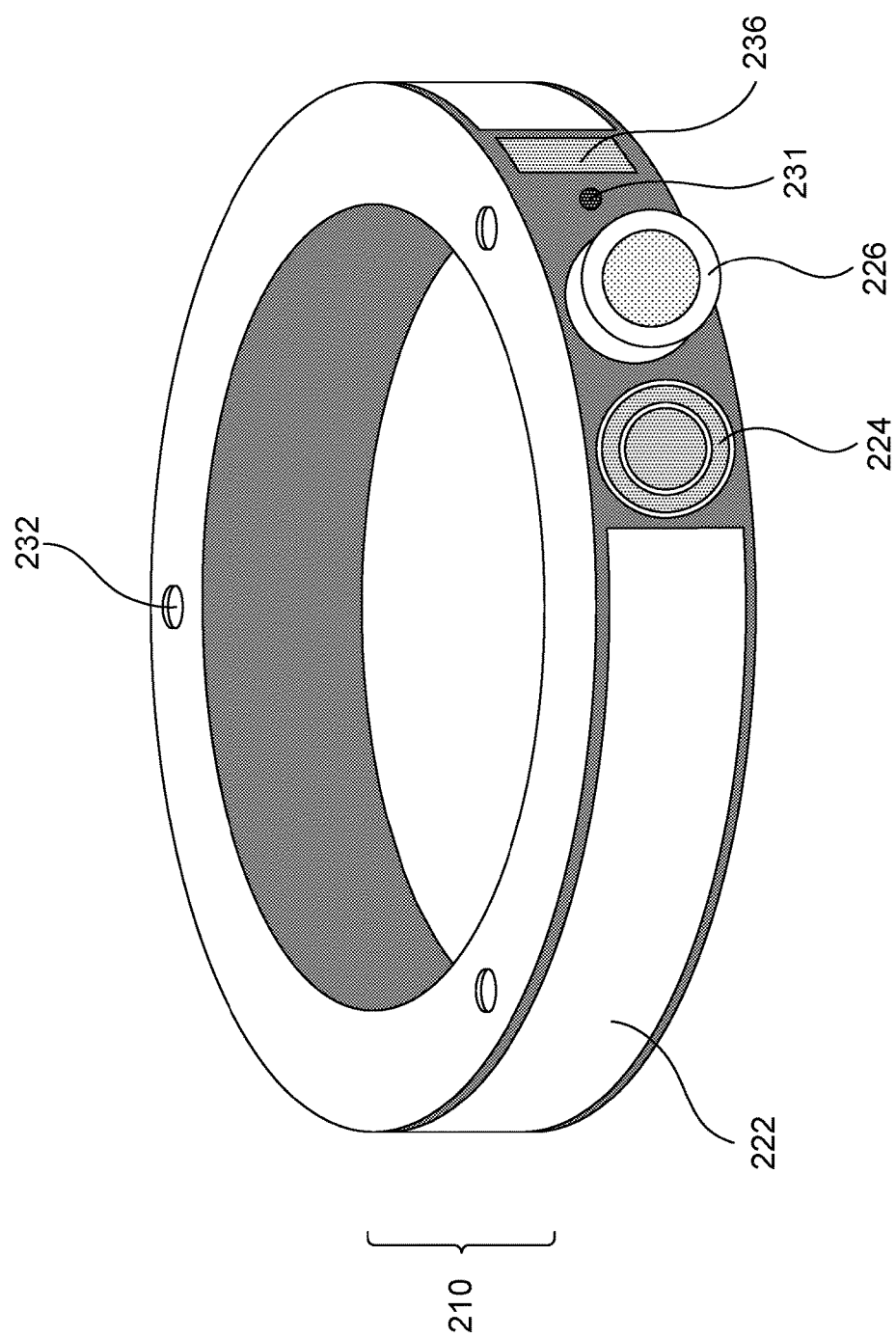
FIG. 2A-2B are an isometric view and a cross-section view, respectively, of an electronic ring, according to an embodiment of the present invention.
Figure 2B:
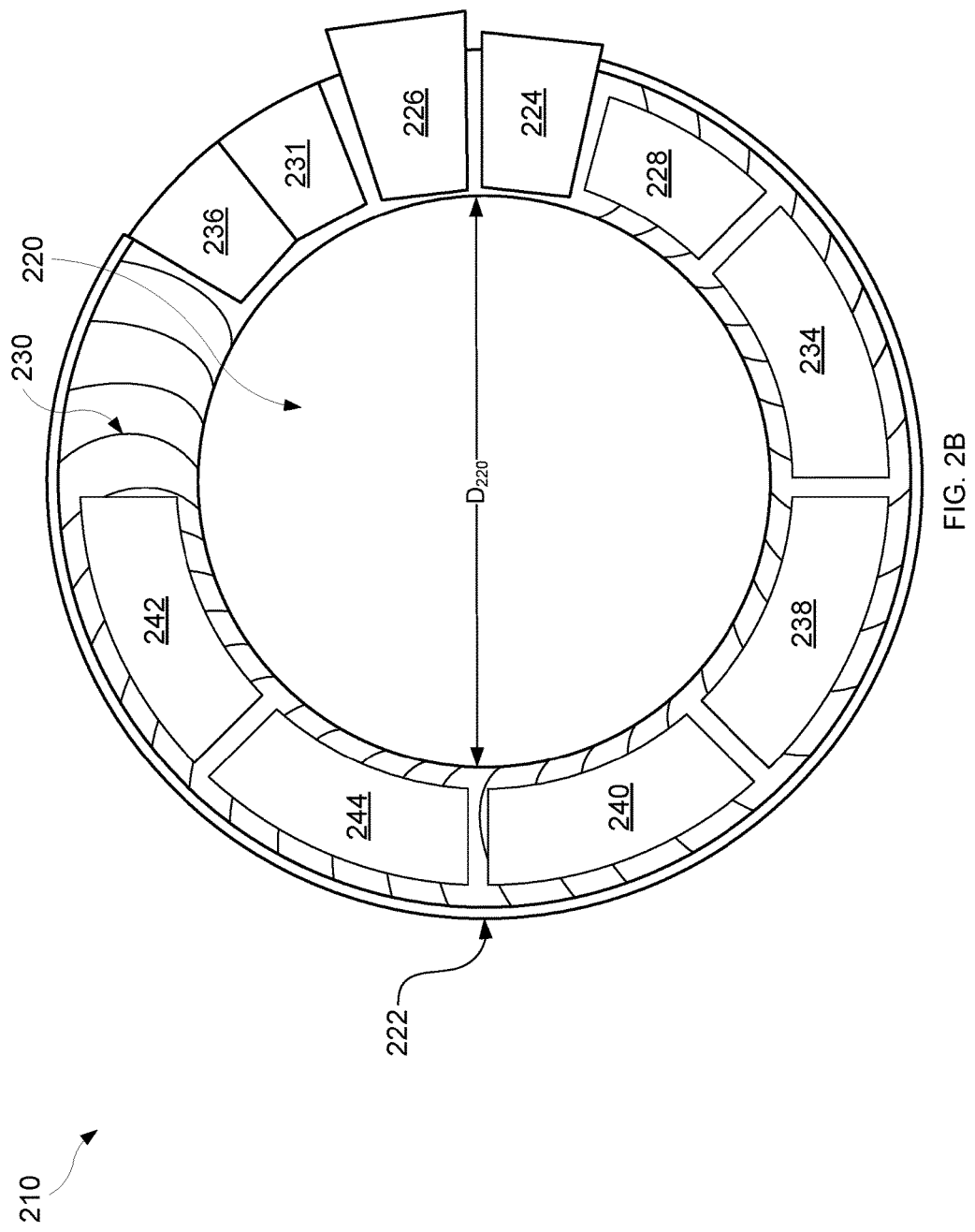

Referring now to FIGS. 2A-2B, an isometric view and a cross-section view, respectively, illustrating an electric ring 210 is shown. In an embodiment, the electric ring 210 may have a cylindrical shape with a hollow inner region 220. In another embodiment, the electric ring 210 may have a torus shape. In an embodiment, the electric ring 210 may be substantially circular when viewed from the top or bottom. In another embodiment, the electric ring 210 may be oval or oblong when viewed from the top or bottom. An outer shell of the electric ring 210 may be composed of any material known in the art, such as, for example, metal, plastic, or a combination thereof. In an embodiment, the electric ring 210 may be worn on a user's body, such as, for example, a finger, wrist, ankle, arm, leg, neck, waist etc. In a preferred embodiment, a user may wear the electric ring 210 on a finger. The hollow inner region 220 may have a diameter $D_{220}$ ranging from approximately 1 cm to approximately 50 cm, and ranges therebetween. In a preferred embodiment, the diameter $D_{220}$ may range from approximately 1 cm to approximately 3 cm, and ranges therebetween.

The electric ring 210 may include one or more energy receiver devices 230 (hereinafter "energy receiver devices"). The energy receiver devices 230 may include any energy receiving technology known in the art, such as, for example, a near-field receiver device, a far-field receiver device, or any combination thereof. Near-field receiver devices may include, for example, an inductive coupling receiver, a capacitive coupling receiver, and a magnetodynamic coupling receiver. In a preferred embodiment, the energy receiver devices 230 may include a resonant inductive coupling device.

The electric ring 210 may include an energy storage device 240. The energy storage device 240 may be situated within the electric ring 210. The energy storage device 240 may be smaller than the energy storage device 122 (FIG. 1B) to allow space for energy dependent devices within the electric ring 210. The energy storage device 240 may include any energy storage technology known in the art, such as, for example, a battery, capacitor, fuel cell, flywheel, superconducting magnetic energy storage (SMES), or any combination thereof. In an embodiment, the energy storage device 240 may include a rechargeable battery, such as, for example, a flow battery, lead-acid battery, lithium air battery, lithium-ion battery, lithium-iron battery, molten salt battery, nickel-cadmium battery, nickel-hydrogen battery, nickel-iron battery, nickel metal hydroxide battery, nickel-zinc battery, organic radical battery, polymer-based battery, polysulfide bromide battery, potassium-ion battery, rechargeable alkaline battery, silicon air battery, silver-zinc battery, silver calcium battery, sodium-ion battery, sodium-sulfur battery, sugar battery, super iron battery, ultrabattery, or any combination thereof. In a preferred embodiment, the electric ring 210 may include a rechargeable lithium-iron battery. The energy storage device 240 may be charged using any charging device known in the art, such as, for example, an induction based charging device. In a preferred embodiment, the energy storage device 240 may be charged by the energy receiver devices 230. The energy storage device 240 may enable electric ring 210 to preserve data within a computer readable storage medium 228 by providing continuous and reliable energy to the computer readable storage medium 228. The energy storage device 240 may abate energy variations from the energy receiver devices 230. The energy storage device 240 may provide electricity to one or more energy consuming devices in the electric ring 210 at a substantially consistent voltage and current.

The electric ring 210 may contain one or more power converter devices 244 (hereinafter "power converter"). The power converter 244 may include any power conversion technology known in the art, such as, for example, a direct current (DC) to alternating current (AC) converter (e.g. an inverter), AC to DC converter (e.g. a rectifier), a DC to DC converter (e.g. a voltage regulator), an AC to AC converter (e.g. a transformer), or any combination thereof. In an embodiment, the energy receiver device 230 may provide AC to the power converter 244 that the power converter 244 may change to DC. In an embodiment, DC may be delivered from the power converter 244 to the energy storage device 240.

The electric ring 210 may contain a coupling mechanism 232 to attach the energy storage ring to another device. The coupling mechanism 232 may include a coupling device known in the art, such as, for example, a male or female connector, male or female fastener, curved surface, magnet, or any combination thereof. For example, the coupling mechanism 232 may comprise a female connector and a magnet.

The electric ring 210 may include one or more energy consuming devices. Non-limiting examples of energy consuming devices include a computer readable storage medium, display, microphone, speaker, projector, motion tracking device, wireless communication device, or any combination thereof. The one or more energy consuming devices may consume more energy than devices in a conventional low functionality electric ring. Several energy consuming devices are discussed below. The energy consuming devices discussed below should not be interpreted as a comprehensive list. In other embodiments, additional energy consuming devices are contemplated.

The electric ring 210 may include a computer readable storage medium 228. The computer readable storage medium 228 can be a tangible device that can retain and store data, including instructions for use by an instruction execution device. The computer readable storage medium 228 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium 228 includes the following: a portable computer diskette, a hard disk, a random access memory (RAM), a read-only memory (ROM), an erasable programmable read-only memory (EPROM or Flash memory), a static random access memory (SRAM), and any suitable combination of the foregoing. The computer readable storage medium 228, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The electric ring 210 may include a processor 234. The processor 234 may include any data processing device known in the art, such as, for example, a central processing unit (CPU) or any other device or combination of devices that carry out computer program instructions. Computer readable program instructions may be provided to the processor 234 of a general purpose computer, special purpose computer, or other programmable data processing apparatus within the electric ring 210, such that the instructions, which execute via the processor of the computer or other programmable data processing apparatus, create means for implementing programmed functions. These computer readable program instructions may also be stored in a computer readable storage medium 228 that can direct a computer, a programmable data processing apparatus, and/or other devices to function in a particular manner, such that the computer readable storage medium 228 having instructions stored therein comprises an article of manufacture including instructions which implement aspects of the programmed function. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the programmed functions. Computer readable program instructions described herein can be downloaded to respective computing/processing devices from a computer readable storage medium 228 or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium 228 within the respective computing/processing device.

In an embodiment, the electric ring 210 may include a display 222. In an embodiment, the display 222 may wrap completely around the outer surface of the electric ring 210. In another embodiment, the display 222 may wrap only partially around the outer surface of the electric ring 210. The display 222 may show text, images, colors, patterns, or any other visual data. In an embodiment, visual data may be shown across more than one display 222. For example, a user may wear the electric ring 210 on an index finger and on a middle finger so that visual data may be shown across the index finger display 222 and the middle finger display 222. Specifically, text may scroll across the middle finger display 222 toward the index finger display 222 and then be shown on the index finger display 222 and scroll across the index finger display 222. In another example, a user may wear more than one electric ring 210 on the same finger where a portion of an image may be shown on each display 222 resulting in a full image spanning the more than one electric rings 210. The display 222 may include touch screen capabilities where a user may provide input by swiping or taping the display 222. For example, a user may swipe along a length of the display 222 to scroll through text on the display 222. In another example, a user may tap the display 222 one or more times to turn the display on or off. In another example, a user may tap or swipe the display 222 to control other devices in the electric ring 210. In an embodiment, the display 222 may include a fingerprint detection device. The fingerprint detection device may be used as a password to prevent users, other than one or more primary user(s), from accessing data or applications on the electric ring 210. In an embodiment, the display 222 may provide data without user input, such as, for example, a unique color shown on the display 222 to indicate different kinds of messages or alerts are waiting to be viewed by the user.

In an embodiment, the electric ring 210 may include a microphone 231. Audio data generated from the microphone 231 may be stored in the computer readable storage medium 228 or transmitted to another device. In an embodiment, the electric ring 210 may include a speaker 236. The speaker 236 may generate sound based on audio data stored within the computer readable storage medium 228 or from audio data transmitted from another device. In an embodiment, the electric ring 210 may include a camera 224. The camera 224 may capture images which may be stored within the computer readable storage medium 228 or transferred to another device. In an embodiment, the electric ring 210 may include a projector 226. The projector 226 may project images on a projection surface, such as, for example, a wall, desk, piece of paper, person's forearm, etc. The electric ring 210 may detect an angle between the projector 226 and the projection surface and adjust the projected image accordingly. The projector 226 may operate in conjunction with the speaker 236 by showing a video on a surface while the speaker 236 provides corresponding sound for the video. The projector 226 may utilize image data stored within the computer readable storage medium 228 or transmitted from another device.

The electric ring 210 may include one or more motion tracking devices 242, such as, for example, an accelerometer, gyroscope, compass, or any combination thereof. Data from the one or more motion tracking devices 242 may be stored in the computer readable storage medium 228 or transferred to another device. Data from the one or more motion tracking devices 242 may be analyzed through a processor 234 within or analyzed through a processor within another device. Data from the one or more motion tracking devices 242 may be used for any application known in the art, such as, for example, providing a user with fitness information, providing a user with location information, or any combination thereof.

The electric ring 210 may include one or more wireless communication devices 238 (hereinafter "wireless communication devices"). The wireless communication devices 238 may include one or more wireless communication technology known in the art, such as, for example, a personal area network (PAN) device, a wireless local area network (WLAN) device, a mobile telecommunications device, an ultra-high frequency radio wave device, or any combination thereof. The wireless communication devices 238 may send or receive data from another device, such as, for example, a smartphone, tablet, laptop computer, desktop computer, smart watch, automobile, network server, or any other device with wireless communication capabilities.

In an embodiment, the electric ring 210 may serve as a keyless car remote by communicating with an automobile. For example, the electric ring 210 may allow a user to enter and turn on the automobile without using a traditional mechanical key. In an embodiment, the electric ring 210 may communicate automatically with the automobile once the user is within proximity of the automobile. In another embodiment, the electric ring 210 may communicate with the automobile after a user input, such as, for example, taping or swiping the display 222.

Figure 3:
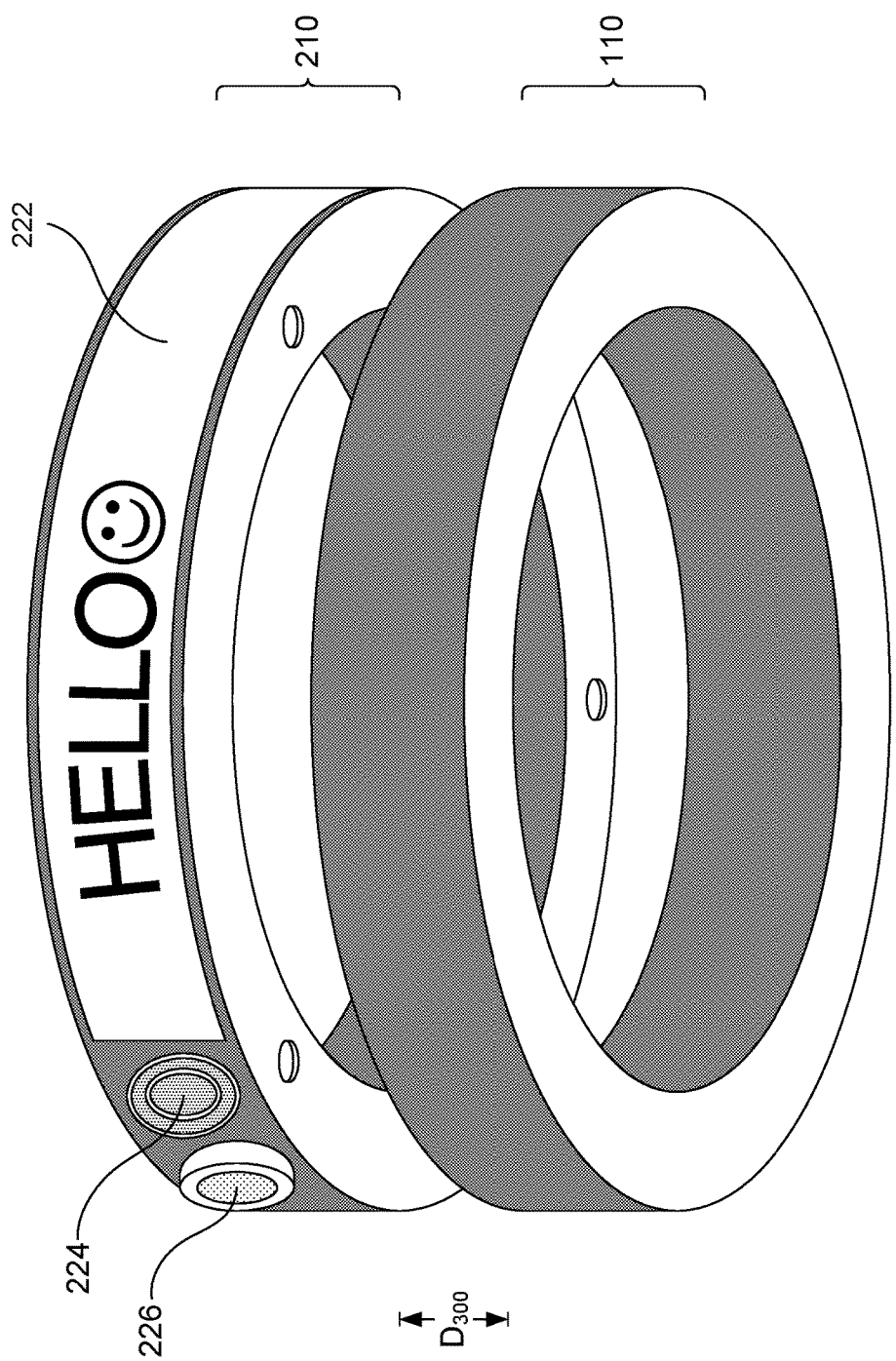
FIG. 3 is an isometric view of the energy storage ring and the electronic ring separated by a distance, according to an embodiment of the present invention.

Referring to FIG. 3, an isometric view illustrating the energy storage ring 110 at a distance $D_{300}$ from the electric ring 210 is shown. The energy storage ring 110 may transfer energy to the electric ring 210 over the distance $D_{300}$. The distance $D_{300}$ may also be referred to as a proximity. The energy storage ring 110 may provide the electric ring 210 with sufficient energy to run energy consuming devices, such as, for example, the display 222, the camera 224, the projector 226, or any combination thereof. The energy storage ring 110 may transmit energy to the electric ring 210 using any wireless energy transmission method known in the art, such as, for example, near-field transmission, far-field transmission, or any combination thereof. Near-field transmission methods may include, for example, inductive coupling, capacitive coupling, and magnetodynamic coupling. In a preferred embodiment, the energy storage ring 110 may transmit energy to the electric ring 210 using resonant inductive coupling. A far-field transmission method may enable energy transfer over vast distances but may result in substantial energy losses. By using a near-field transmission method, the distance $D_{300}$ may range from approximately 0 centimeters to approximately 3 meters, and ranges therebetween. In a preferred embodiment, the distance $D_{300}$ may range from approximately 0 centimeters to approximately 10 centimeters, and ranges therebetween. In an embodiment where the distance $D_{300}$ is 0 centimeters, the energy storage ring 110 and the electric ring 210 may be in contact with one another. Smaller ranges for the distance $D_{300}$ may be preferred to reduce energy losses during the transfer of energy from the energy storage ring 110 to the electric ring 210.

The energy storage ring 110 and the electric ring 210 may be attached to one another using the coupling mechanism 132 (FIG. 1A) and the coupling mechanism 232 (FIG. 2A). The coupling mechanism 132 and the coupling mechanism 232 may include any interlocking technology known in the art, such as, for example, a male or female connector, male or female fastener, curved surface, magnet, or any combination thereof. The coupling mechanism 132 and the coupling mechanism 232 may be complementary devices. For example, if the coupling mechanism 132 includes a male connector, the coupling mechanism 232 may include a female connector. In another example, if the coupling mechanism 132 includes a curved surface, the coupling mechanism 232 may include a corresponding curved surface to that the coupling mechanism 232 may connect to the coupling mechanism 132. In another example, the coupling mechanism 132 and the coupling mechanism 232 may include corresponding curved surfaces and corresponding magnets.

Although only a single energy storage ring 110 and a single electric ring 210 is shown in FIG. 3, embodiments including more than one energy storage ring 110 and/or more than one electric ring 210 are contemplated. For example, more than one energy storage ring 110 may be used so that a first energy storage ring 110 may be charging while a second energy storage ring 110 may be providing the electric ring 210 with energy. In another example, a second energy storage ring may be configured to transmit energy to the electric ring 110 independently and concurrently with the first energy storage ring 110 for at least a duration of time. The duration of time for concurrent operation of the first and second energy storage ring 110 may be as little as milliseconds. In a preferred embodiment, the duration of time for the concurrent operation of the first and second energy storage ring 110 may be long enough to ensure uninterrupted power supply to the electric ring 210. More than one energy storage ring 110 may reduce or eliminate energy supply interruptions for the electric ring 210. In an embodiment, more than one electric ring 210 may be used to provide redundant energy consuming devices and/or provide varying energy consuming devices on each electric ring 210. For example, the display 222 may be included on more than one electric ring 210 so a user may have a larger display extending to multiple rings. In another example, one electric ring 210 may include a projector 226 and speaker 236 (FIG. 2B) while another electric ring 210 may include a camera 224 and microphone 231 (FIG. 2B). The electric ring 210 with a camera 224 and a microphone 231 may collect visual and audio data while the electric ring 210 with a projector 226 and speaker 236 may project visual data on a surface and provide audio data directly though the speaker 236. Non-limiting combinations of one or more electric ring 210 having one or more energy consuming devices are contemplated.

Embodiments of the present invention may relate generally to powering an electric ring 210 with an external power source. An energy storage ring may be used to store energy and transmit energy to the electric ring. By storing energy in a separate energy storage ring, substantially more energy may be available to power energy consuming devices in the electric ring. Having substantially more energy available to power the electric ring may allow for devices which consume substantially more energy and may reduce down time from charging. In addition, since the energy storage ring may be separated from the electric ring, the energy storage ring may be easily replaced by another energy storage ring to reduce power supply interruptions for the electric ring. By utilizing a separate ring to store energy, substantially more energy may be available for use by the electric ring, thus substantially increasing types and number of devices that may reasonably be included in the electric ring.

What is claimed is:

1. A method for powering an electric ring comprising:

forming a first energy storage ring having a cylindrical shape with a hollow inner region, wherein the first energy storage ring includes an energy storage device and an energy transmission device, wherein the energy storage device is electrically connected to the energy transmission device;

forming a first electric ring having a cylindrical shape with a hollow inner region, wherein the first electric ring includes an energy receiver device and one or more energy consuming devices, wherein the energy receiver device is electrically connected to one or more energy consuming devices;

wherein the energy receiver device of the first electric ring is configured to receive energy generated by the energy transmission device of the first energy storage ring;

wherein the first energy storage ring and the first electric ring comprise a coupling mechanism for coupling the first energy storage ring and the first electric ring forming a second energy storage ring having a cylindrical shape with a hollow inner region, wherein the second energy storage ring includes an energy storage device and an energy transmission device, wherein the energy storage device is electrically connected to the energy transmission device;

forming a second electric ring having a cylindrical shape with a hollow inner region, wherein the second electric ring includes an energy receiver device and one or more energy consuming devices, wherein the energy receiver device is electrically connected to one or more energy consuming devices;

wherein the energy receiver device of the second electric ring is configured to receive energy generated by the energy transmission device of the second energy storage ring;

wherein the second energy storage ring and the second electric ring comprise a coupling mechanism for coupling the first energy storage ring and the first electric ring; and communicating, by the first electric ring, with the second electric ring.

* * * * *